(12) United States Patent
Welck

(10) Patent No.: US 10,564,917 B2
(45) Date of Patent: *Feb. 18, 2020

(54) MODULAR USER-TRAVERSABLE DISPLAY SYSTEM

(71) Applicant: Steve Welck, Costa Mesa, CA (US)

(72) Inventor: Steve Welck, Costa Mesa, CA (US)

(73) Assignee: Steve Welck, Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,018

(22) Filed: Dec. 25, 2018

(65) Prior Publication Data

US 2019/0129679 A1    May 2, 2019

Related U.S. Application Data

(63) Continuation of application No. 14/277,008, filed on May 13, 2014, now Pat. No. 10,162,591.

(60) Provisional application No. 61/822,859, filed on May 13, 2013.

(51) Int. Cl.
| | |
|---|---|
| G06F 3/14 | (2006.01) |
| A63G 31/16 | (2006.01) |
| G09F 9/302 | (2006.01) |
| G09B 9/06 | (2006.01) |
| A63G 31/00 | (2006.01) |
| G09B 9/30 | (2006.01) |

(52) U.S. Cl.
CPC ............ *G06F 3/1446* (2013.01); *A63G 31/16* (2013.01); *G09B 9/066* (2013.01); *G09F 9/3026* (2013.01); *A63G 2031/005* (2013.01); *G09B 9/30* (2013.01); *G09G 2300/026* (2013.01)

(58) Field of Classification Search
CPC . G06F 3/1446; A63G 31/16; A63G 2031/005; G09B 9/066; G09B 9/30; G09F 9/3026; G09G 2300/026
See application file for complete search history.

(56) References Cited

U.S. PATENT DOCUMENTS

| | | | |
|---|---|---|---|
| 4,464,029 | A | 8/1984 | Jaulmes |
| 4,885,878 | A | 12/1989 | Wuu |
| 5,556,340 | A | 9/1996 | Bohn et al. |
| 5,655,909 | A | 8/1997 | Kitchen et al. |
| 5,674,127 | A | 10/1997 | Horstmann et al. |
| 5,833,340 | A | 11/1998 | Yoshikawa et al. |
| 5,951,018 | A | 9/1999 | Mamitsu |
| 6,152,739 | A | 11/2000 | Amery et al. |
| 6,327,020 | B1 | 12/2001 | Iwata |
| 6,339,429 | B1 | 1/2002 | Schug |
| 6,905,218 | B2 | 6/2005 | Courchesne |
| 7,229,176 | B2 | 6/2007 | Onaga |

(Continued)

OTHER PUBLICATIONS

United States Patent and Trademark Office, U.S. Appl. No. 14/277,008, Final Office Action dated Jan. 5, 2016.

(Continued)

*Primary Examiner* — Sejoon Ahn
(74) *Attorney, Agent, or Firm* — Wong & Rees LLP; Kirk D. Wong

(57) ABSTRACT

A coiled coil geometry of modular concave LED/OLED panels or "tiles" can effectively display a simulated barreling wave. The structure of the coiled coil LED/OLED modules allows one or more users/participants to stand on and/or sit in a motion or non-motion seating platform to observe the simulation.

17 Claims, 11 Drawing Sheets

(56) References Cited

U.S. PATENT DOCUMENTS

| | | |
|---|---|---|
| 7,766,483 B2 | 8/2010 | Balu et al. |
| 2002/0032553 A1 | 3/2002 | Simpson et al. |
| 2003/0151562 A1 | 8/2003 | Kulas |
| 2003/0164925 A1 | 9/2003 | Kutner |
| 2004/0029094 A1 | 2/2004 | McGraw |
| 2004/0109022 A1 | 6/2004 | Bennett et al. |
| 2006/0114171 A1 | 6/2006 | Vascotto et al. |
| 2006/0268240 A1 | 11/2006 | Miles |
| 2006/0274024 A1* | 12/2006 | Wey .................. H05B 33/0809 345/102 |
| 2007/0069086 A1 | 3/2007 | Ponder et al. |
| 2007/0117068 A1 | 5/2007 | Nelms et al. |
| 2007/0155495 A1 | 7/2007 | Goo |
| 2007/0156540 A1 | 7/2007 | Koren et al. |
| 2008/0206720 A1 | 8/2008 | Nelson |
| 2008/0254881 A1 | 10/2008 | Lutnick et al. |
| 2008/0268949 A1 | 10/2008 | Dell |
| 2009/0118611 A1 | 5/2009 | He |
| 2009/0128461 A1 | 5/2009 | Geldard et al. |
| 2009/0201430 A1* | 8/2009 | Streid ...................... G09B 9/08 348/744 |
| 2010/0087239 A1 | 4/2010 | Fisher |
| 2010/0097304 A1 | 4/2010 | Vidal et al. |
| 2010/0208029 A1 | 8/2010 | Marti et al. |
| 2013/0032053 A1 | 2/2013 | Stoker |
| 2013/0072830 A1 | 3/2013 | Illindala et al. |
| 2013/0181901 A1 | 7/2013 | West |
| 2014/0039299 A1 | 2/2014 | Foo et al. |
| 2014/0333507 A1 | 11/2014 | Welck |

OTHER PUBLICATIONS

United States Patent and Trademark Office, U.S. Appl. No. 14/277,008, Final Office Action dated May 30, 2017.

United States Patent and Trademark Office, U.S. Appl. No. 14/277,008, Non-Final Office Action dated Jul. 22, 2015.

United States Patent and Trademark Office, U.S. Appl. No. 14/277,008, Non-Final Office Action dated Aug. 11, 2016.

United States Patent and Trademark Office, U.S. Appl. No. 14/277,008, Non-Final Office Action dated Dec. 29, 2017.

United States Patent and Trademark Office, U.S. Appl. No. 14/277,008, Notice of Allowance dated Aug. 10, 2018.

* cited by examiner

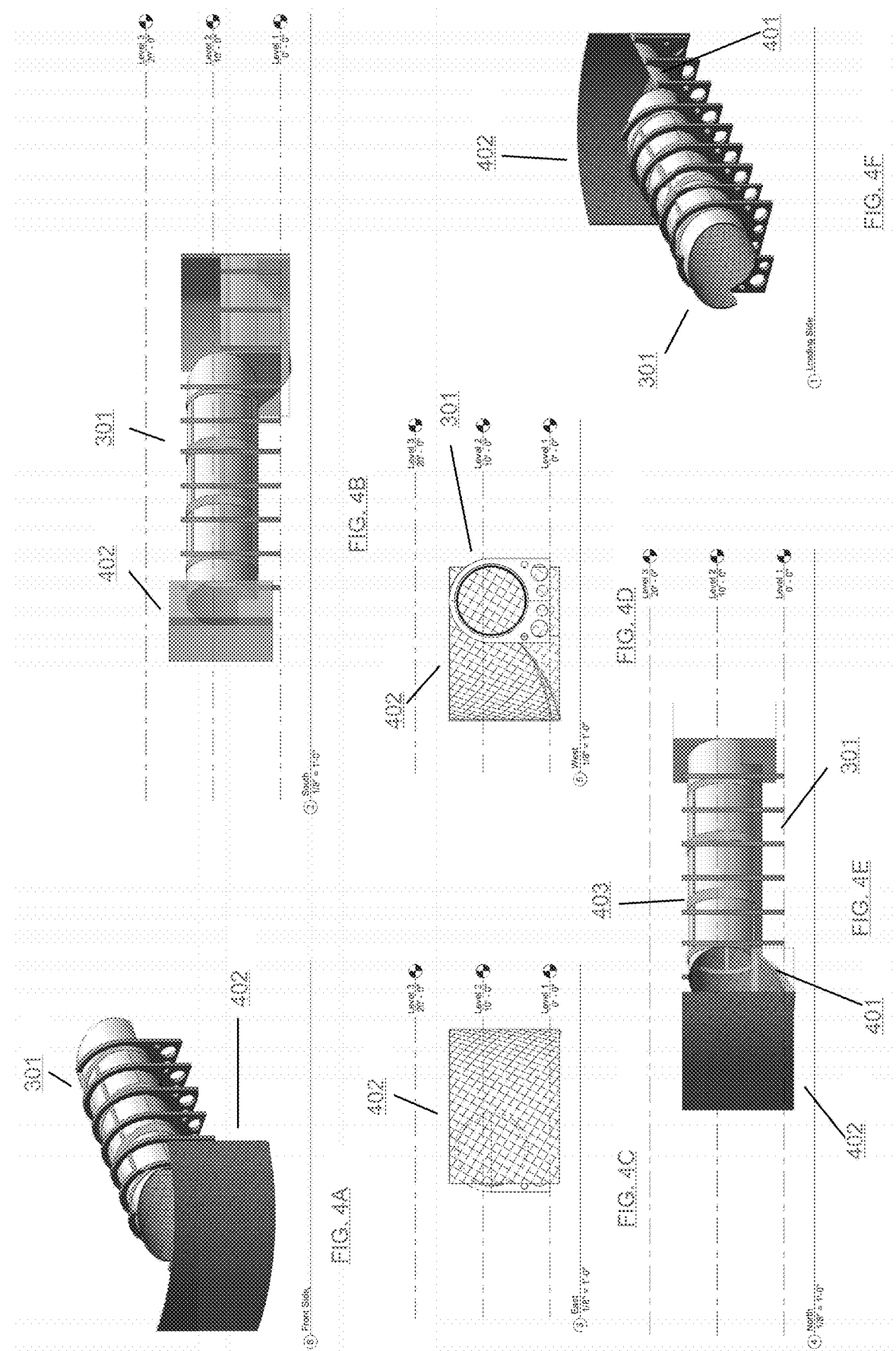

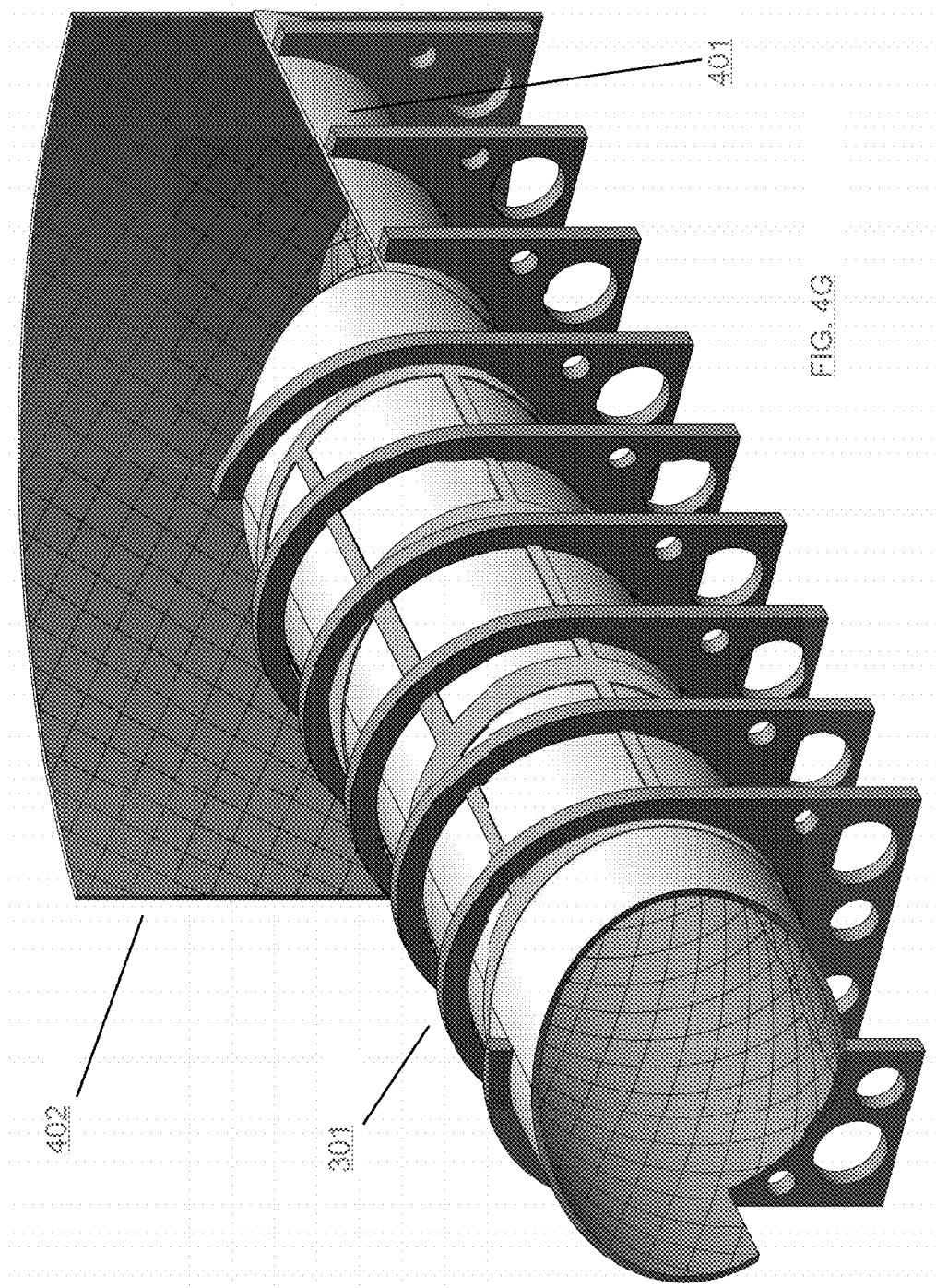

MODULAR USER-TRAVERSABLE DISPLAY SYSTEM

CROSS-REFERENCE TO RELATED APPLICATIONS; PRIORITY CLAIM

This application claims benefit as a Continuation of application Ser. No. 14/277,008, filed May 13, 2014, which claims benefit of Provisional Application No. 61/822,859, filed May 13, 2013, the entire contents of the foregoing are incorporated by reference as if fully set forth herein under 35 U.S.C. § 120. The applicant hereby rescinds any disclaimer of claim scope in the parent application(s) or the prosecution history thereof and advises the USPTO that the claims in this application may be broader than any claim in the parent application(s).

TECHNOLOGY

The present invention relates generally to display systems. More particularly, an embodiment of the present invention relates to construction, configuration, and operation, of modular multi-panel display systems.

BACKGROUND

Existing immersive simulation systems employ projectors projecting images onto formed screen surfaces. Applications attempt to create a simulated environment by using the formed screen surfaces. The drawback to projection-based systems is that the projectors must be hidden somewhere in the simulated environment. Distortions and brightness dropouts in the projected images are introduced because projectors must be hidden behind facades and are often mounted off-axis.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIGS. 4A-H illustrate an immersive surfing simulator comprising coiled coil display modules according to an embodiment of the invention;

DESCRIPTION OF EXAMPLE EMBODIMENTS

Figure 1A:
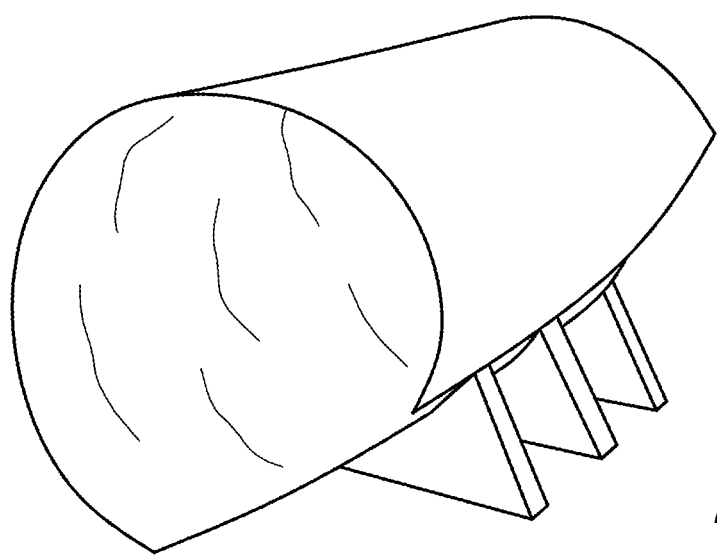
FIGS. 1A and 1B illustrate coiled coil display modules according to an embodiment of the invention.

Example embodiments, which relate to modular multi-panel display systems, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. TERM DEFINITIONS
2. GENERAL OVERVIEW
3. DISPLAY CONSTRUCTION AND CONFIGURATION
4. APPLICATIONS
5. IMPLEMENTATION MECHANISMS—HARDWARE OVERVIEW
6. EQUIVALENTS, EXTENSIONS, ALTERNATIVES AND MISCELLANEOUS

1. Term Definitions

Coiled Coil

Multiple parallel coils joined to create a single coil.

Helical Geometry

Multiple helical bands are joined to create the Coiled Coil. Similar to the coiled windings of parallel multiple strands a term more commonly used to denote special types of winding wire for transformers. Decafilar describes coiled windings made of ten strands.

Plateneomic

Plateneomic coiling and paranemic coiling are descriptions of coils that are bound in such a way that the removal of one coil will break apart the embodiment.

2. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

An embodiment of the invention very closely recreates a realistic barreling wave within a simulated environment. In an embodiment, a modular LED/OLED display can produce truly beautiful video that surpasses more complex and expensive video projection systems onto curved screen surfaces.

An embodiment of the invention addresses the challenges of creating a realistic barreling wave within a simulated environment by arranging geometry which enables curved modular LED/OLED panels to be configured in a unique barreling wave form. Current simulator designs for enveloping and immersive environments have certain limitations, for example, they require sophisticated projection equipment. A challenge to creating a surfing simulator would be to position projectors within or through the projection screen environment. This would greatly take away from the simulator's purpose to convincingly recreate a simulated environment. Holes through the screen or projector enclosures within the space would not perform well in providing a realistic experience. In addition, many challenges would exist in fabricating lenses to project focused images onto curved barrel and irregular screen surfaces. Further, video projection onto curved screen surfaces has less uniformity and light output than that of a modern LED/OLED direct display.

Figure 1B:
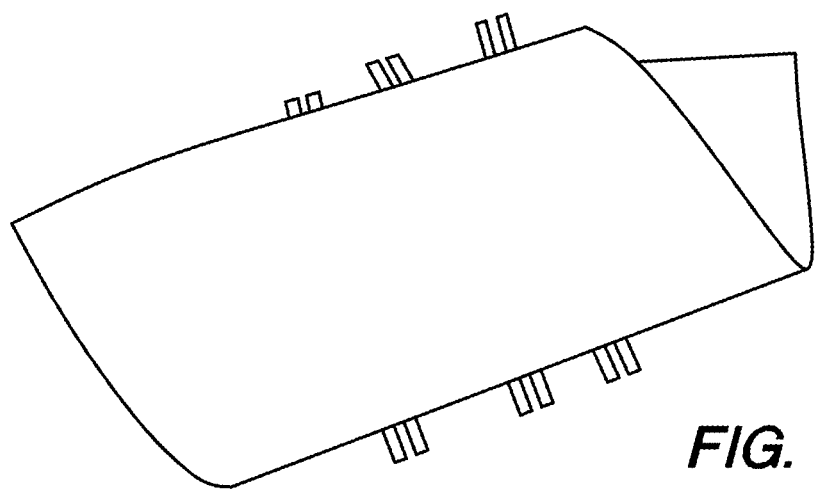

Current advancements in high density LED and OLED display technology allow modular panels to be shaped and joined to create various shapes and sizes. Properly organizing the modules within the limitations of conventional LED/OLED indoor and outdoor screens is a challenge. Referring to FIGS. 1A and 1B, an embodiment of the invention arranges the modular panels into concave barrel segments in a coil shape and then interlaces the coil with matching coils to create a coiled coil solution; thus, shaping the display modules into a unique concave coiled coil provides an embodiment like no other simulator. A coiled coil modular concave display comprised of interlaced multi-panel LED/OLED modules forms a wave shape that provides a hyper-realistic surfing experience.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

3. Display Construction and Configuration

Figure 2A:
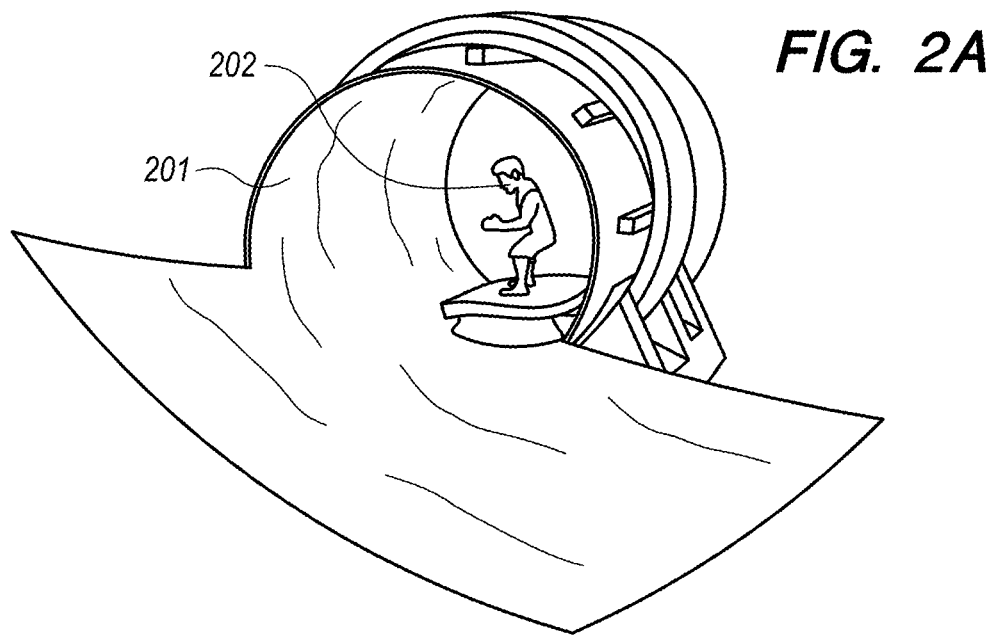
FIGS. 2A and 2B illustrate a surfing simulator comprising coiled coil display modules according to an embodiment of the invention.
Figure 2B:
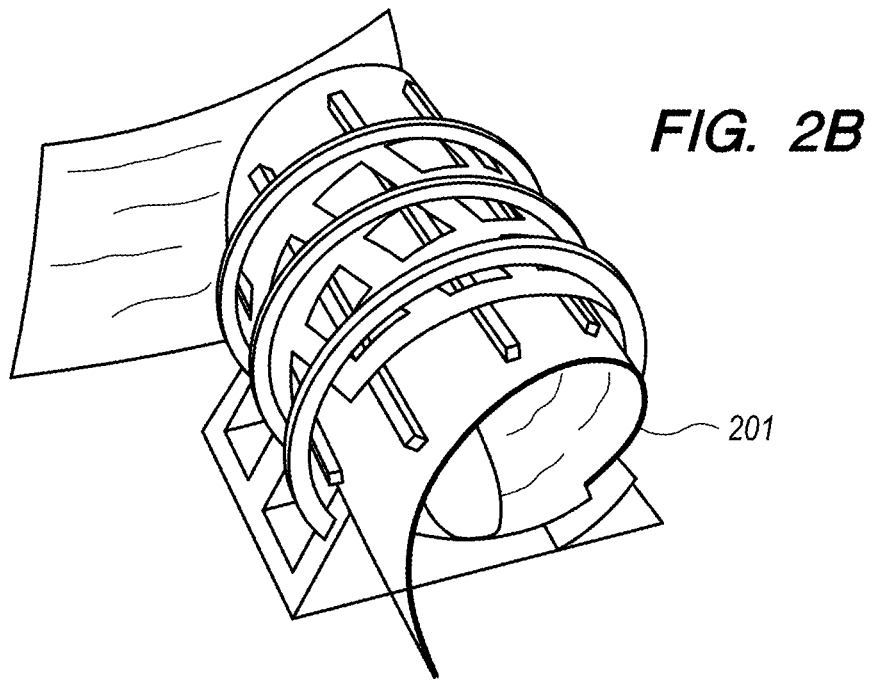

Referring to FIGS. 2A and 2B, in an embodiment of the invention, a coiled coil geometry of modular concave LED/OLED panels or "tiles" 201 forming a simulated barreling wave is shown. The structure of the coiled coil LED/OLED modules 201 allows one or more users/participants 202 to stand on and/or sit in a motion or non-motion seating platform situated within the coiled coil modules.

Figure 3A:
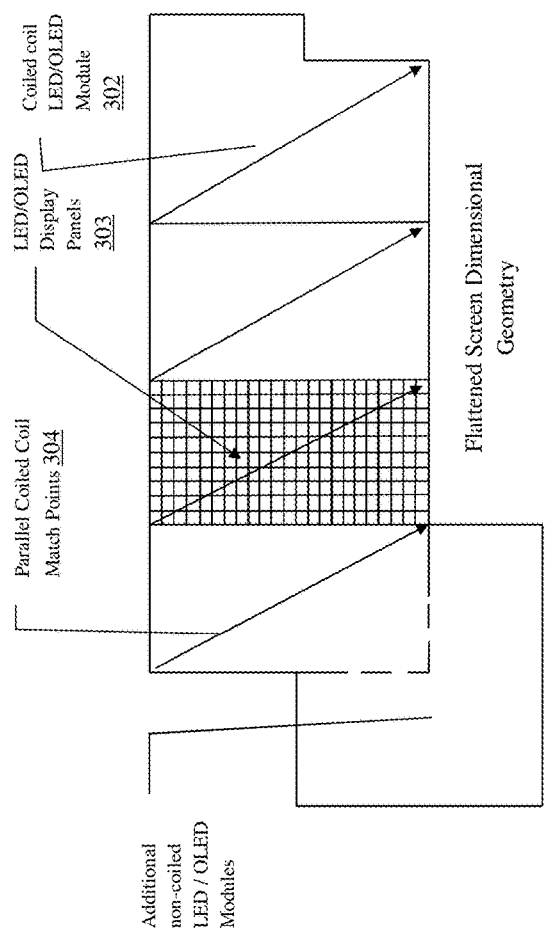
FIGS. 3A and 3B illustrate construction geometry layout of a series of coiled coil display modules according to an embodiment of the invention.
Figure 3B:
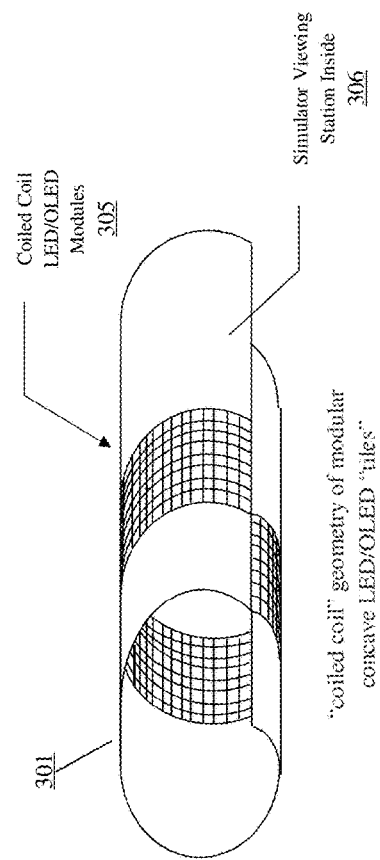
Figure 4H:
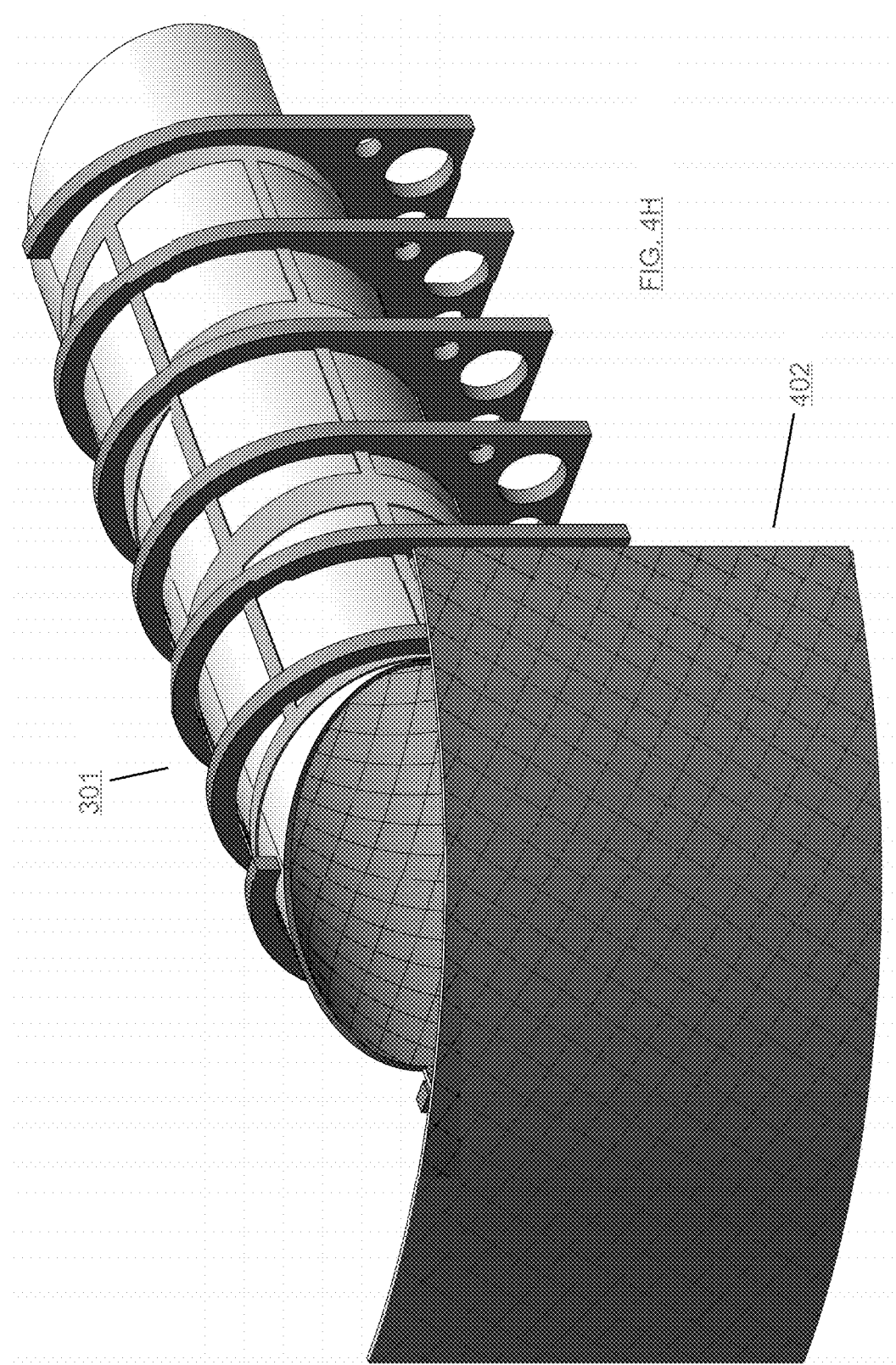

Referring to FIGS. 3A and 3B, in an embodiment of the invention, the method of attaching the coiled coil LED/OLED modules 305 is a uniform tubular metal superstructure. Each coiled coil module 302 may be a single coil of LED/OLED display panels 303. The coiled coil modules 305 are arranged in parallel and an immersive simulator 301 may be formed with as little as four turns (four coiled coil modules). A practical display screen coil size for a simulator can be 8-14 parallel screen coil widths, but this number may vary according to the overall size of the simulator. Special video content can be created to fit on the irregular screen dimensional geometry. A viewing station 306 within the simulator can be located to position the viewer(s) for maximum effect. The viewing station 306 can resemble a surfboard, canoe, kayak, outrigger, etc., and may have some motion base actuation. The viewing station 306 can seat a single or multiple persons.

Referring to FIGS. 4A-4H, in an embodiment of the invention, an example display configuration where a curved emissive screen 301 having a plurality of multi-pixel display modules for a surfing simulator is shown. Each display module has a display surface bound by a periphery. The plurality of display modules are tiled together, edge to edge, to form a helical display surface 301 (tied together using a uniform tubular metal superstructure 403) for producing an image that is a visually uniform, plateneomic coiled coil winding of parallel multiple flat panel modules geometry where each display module renders a portion of the image. A non-coiled curved horizontal display module 401 arranged at the end of the coiled coils 301 along with a vertical non-coiled curved display module 402 is used to give the simulator a depth effect. Participants positioned within the coiled coils 301 look toward the horizontal 401 and vertical 402 non-coiled curved display modules where a horizon may be displayed to orient the participants. The horizontal 401 and vertical 402 non-coiled curved display modules may be comprised of any of: LED panels, OLED panels, LCD panels, etc.

In an embodiment of the invention, each display module is communicatively connected to at least one display signal generator. In an embodiment, a display signal generator may be communicatively connected to a plurality of display modules. The at least one display signal generator is communicatively connected to at least one computer system. The at least one computer system sends video representing the simulation to the at least one display signal generator. An operator may select a scenario, from among possibly a number of scenarios, via a user interface display by the at least one computer system on a local display. The at least one computer system sends the selected scenario video stream to the at least one display signal generator and audio to at least one audio processing system. The at least one display signal generator receives the video stream and calculates what each display module is to display. The result is a seamless display of the scenario video across all of the display modules, thereby providing an immersive simulator experience for participants.

4. Applications

Embodiments of the invention may be arranged to simulate immersive environments discussed below:

Surfing Simulator

Figure 6A:
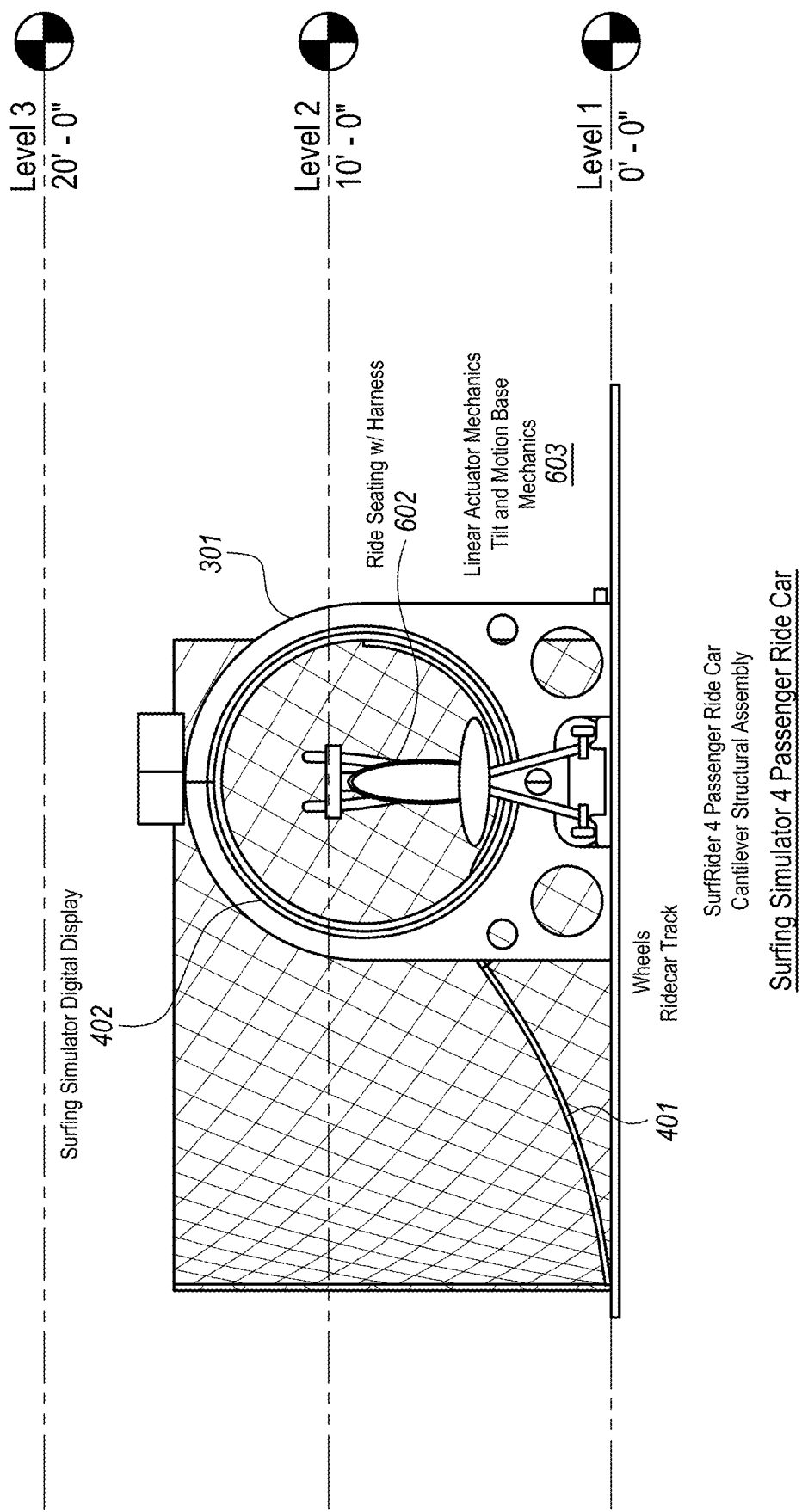
FIGS. 6A and 6B illustrate a surfing simulator according to an embodiment of the invention.
Figure 6B:
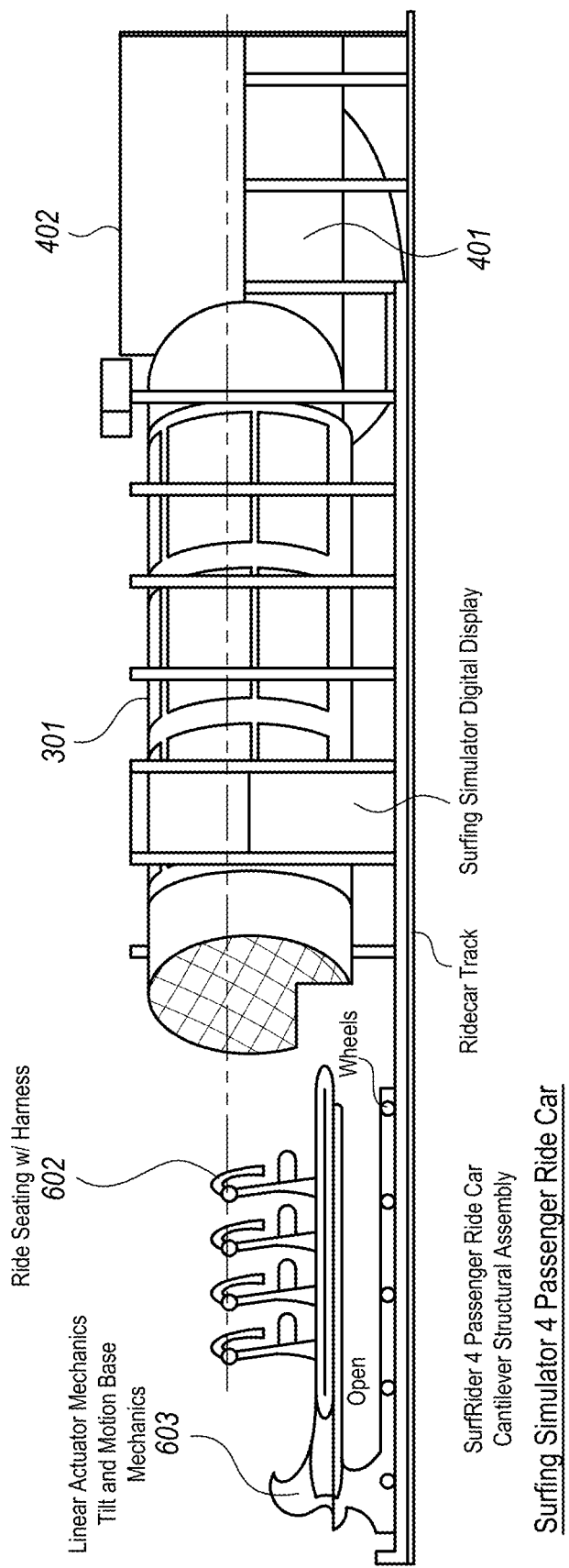

Referring to FIGS. 6A-6B, an embodiment of a surfing simulator is shown. Participants are seated in a riding seat 602 that is attached to a motion base 603 that includes mechanisms that enable the motion base to move the riding seat 301 on any selectable axis or combination of selectable axes. In an embodiment, the movement of the motion base 603 may be synchronized to the video content displayed on the display modules in the coiled coils 301 and horizontal 401 and vertical 402 non-coiled curved display modules. For example, in a surfing simulation embodiment, the motion base 603 may simulate a surfboard riding a wave by moving the riding seat 602 using 3-axis (XYZ) movements to simulate the surf board maneuvering through the water. The riding seat 602 and motion base 603 assembly ride on a transport system that, in one embodiment may be a set or rails, conveyer belt, etc. Using the transport system, the riding seat 602 and motion base 603 assembly is moved to the interior of the coiled coils 301 where participants view video content displayed on the display modules. A ride operator may control the movement of the riding seat 602 and motion base 603 assembly into or out of the interior of the coiled coils 301. The ride operator may also control the movement settings (axis control) of the motion base 603 as well as video and sound effects. Content displayed on the display modules located in the coiled coils 301 and horizontal 401 and vertical 402 non-coiled curved display modules can vary from simulated waves, e.g., a barreling wave, a rolling wave, etc., to imaginative animated environments.

Figure 7:
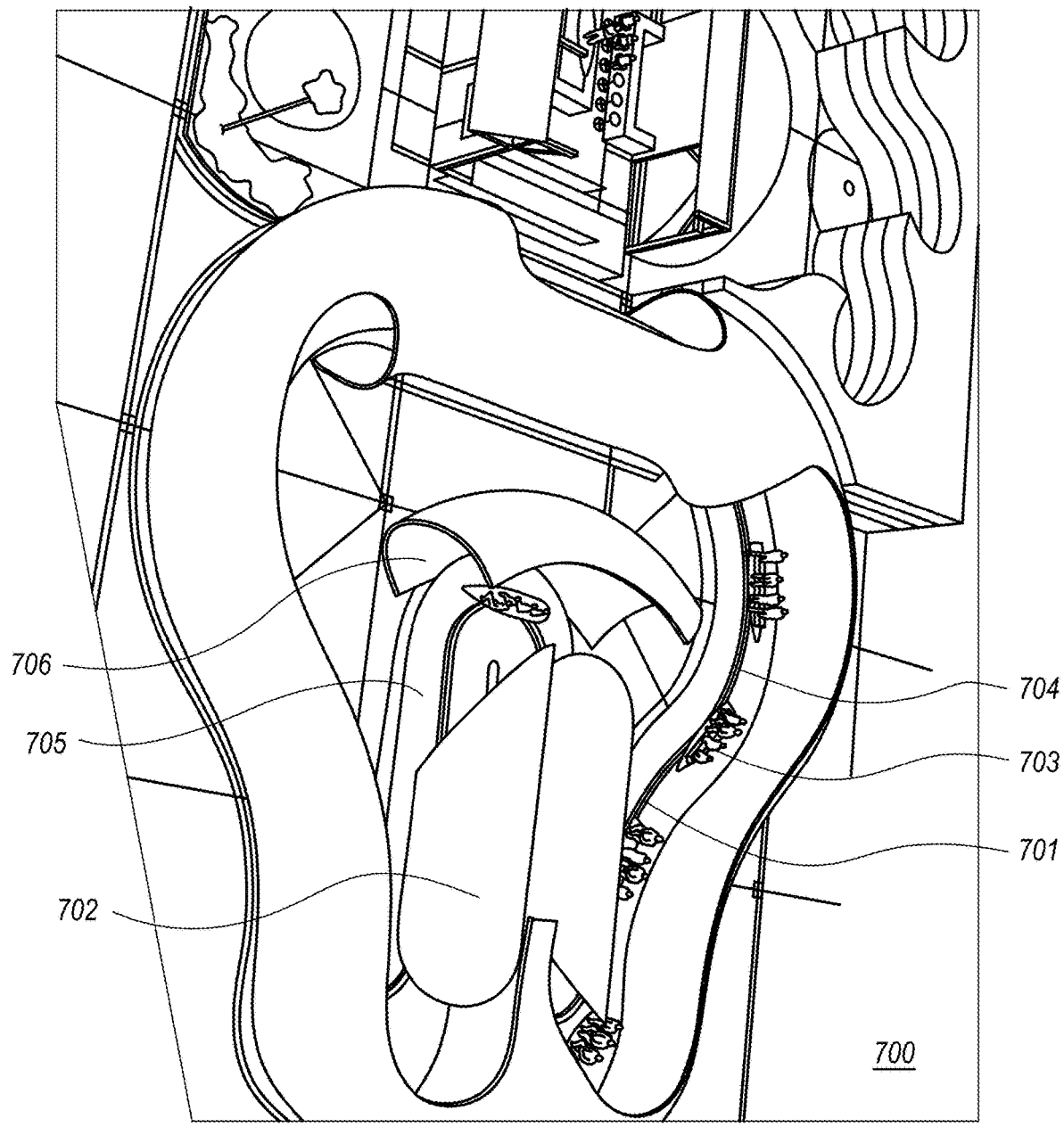
FIG. 7 illustrates a simulation facility comprising multiple coiled coil display modules according to an embodiment of the invention.

Referring to FIG. 7, an embodiment of a simulation facility 700 comprising multiple coiled coil display modules 701, 702, is shown. The simulation facility 700 shown supports a large continuous flow of participants. Multiple motion bases 703 maneuver on a track 704. The track 704 guides the motion bases 703 through the coiled coil display modules 701 and 702. Multiple surfaces such as 705 and 706 may be non-coiled displays that add to the experience of the simulation.

Mobile Exhibition Platform

Figure 8:
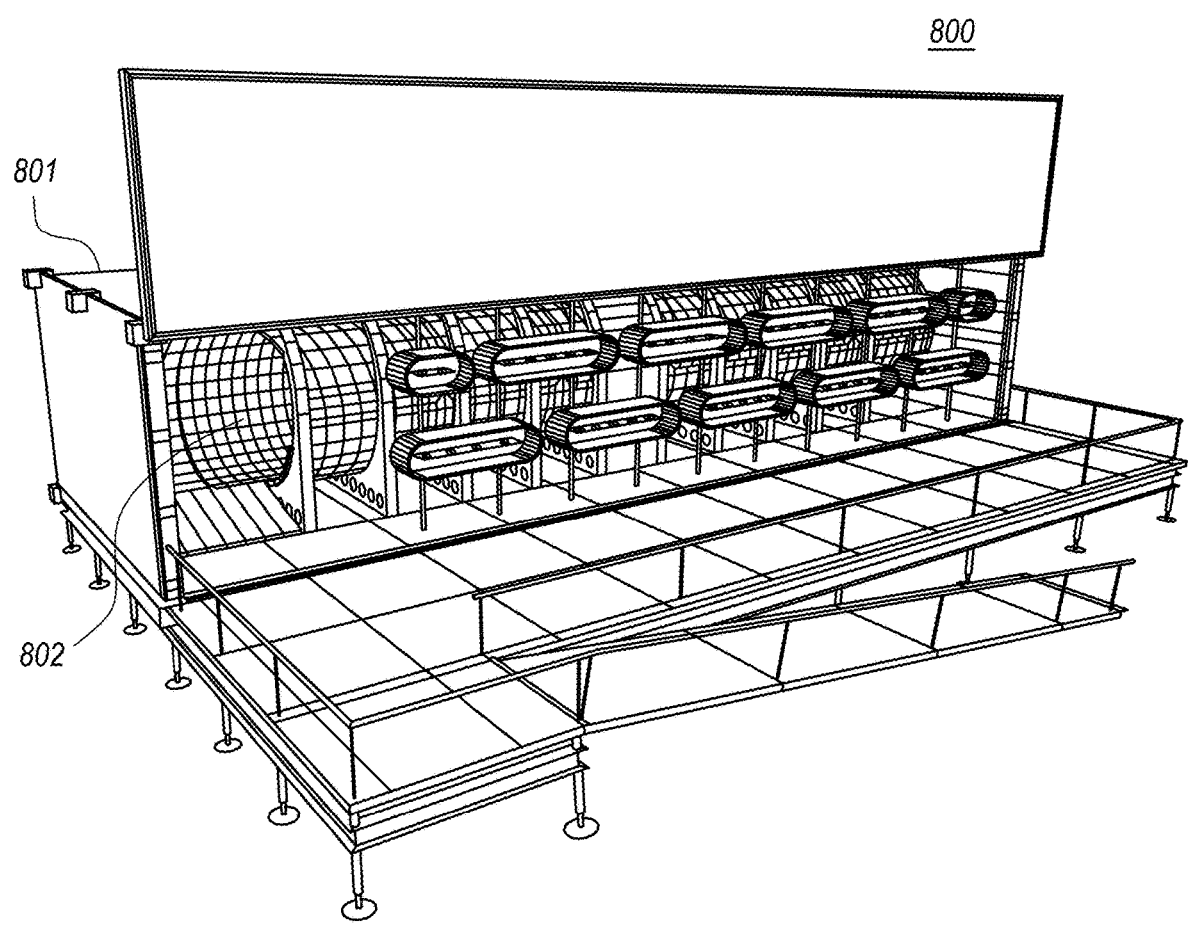
FIG. 8 illustrates a mobile exhibition platform according to an embodiment of the invention.

Referring to FIG. 8, an embodiment of a mobile exhibition platform 800 is shown. The mobile exhibition platform may be based on a portable platform such as a semi-truck trailer, a portable display unit, container unit, etc. A coiled coil display module 802 resides in a structure 801 and allows participants to walk through the coiled coil display module 802 and experience the simulation.

Skateboard Exhibition

Skate ramps using display modules that may be comprised of any of: LED panels, OLED panels, LCD panels, etc. The skate ramps can use curved non-coiled display modules and display any type of simulation such as scenery, texture, ramp features, etc. For example, a "Skate on Water" scenario may be displayed as well as snow, ice, mid-air, any surface that can be displayed, etc. Sponsorship and advertisement logos, videos, etc., can be displayed dynamically on the display modules. Curved non-coiled display modules, as well as coiled coil display modules may also be used for extreme sports visualization, digital brand immersion, immersive digital media, wrap around advertising, etc.

F1 Race Simulator

An F1 or any vehicle racing destination may be displayed on a coiled coil display module. Participants can be seated in a racing-inspired riding seat mounted on a motion base. The coiled coil display module can display scenery as a race progresses. Non-coiled display modules can display forward looking scenery as well as the road features. The configuration may be much like the surfing simulator described above.

Skydiving Simulator

Skydiving into a Big Hole cave may be one selectable scenario. A coiled coil display module may be oriented vertically or horizontally to allow the participants to experience falling through the cave in a vertical or horizontal orientation. Indoor skydiving equipment can also be supported by a vertically oriented coiled coil display. The participant can be floating over the indoor skydiving air flow while viewing the display on the coiled coil display module. The scenery displayed on the display module may be tied to the participant's movements. For example, different pathways may be explored, acceleration/deceleration may be experienced through the scenery movement, etc.

River Rafting Simulator

A river scenario may be displayed that turns down over waterfalls, through rapids, etc. Much like the surfing simulation described above, the river rafting scenario may simply replace a surfboard riding seat with a raft-inspired riding seat.

In various embodiments, an apparatus, a computing system, a display system, etc., performs any or a part of the foregoing methods as described.

Note that, although separate embodiments are discussed herein, any combination of embodiments and/or partial embodiments discussed herein may be combined to form further embodiments.

5. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
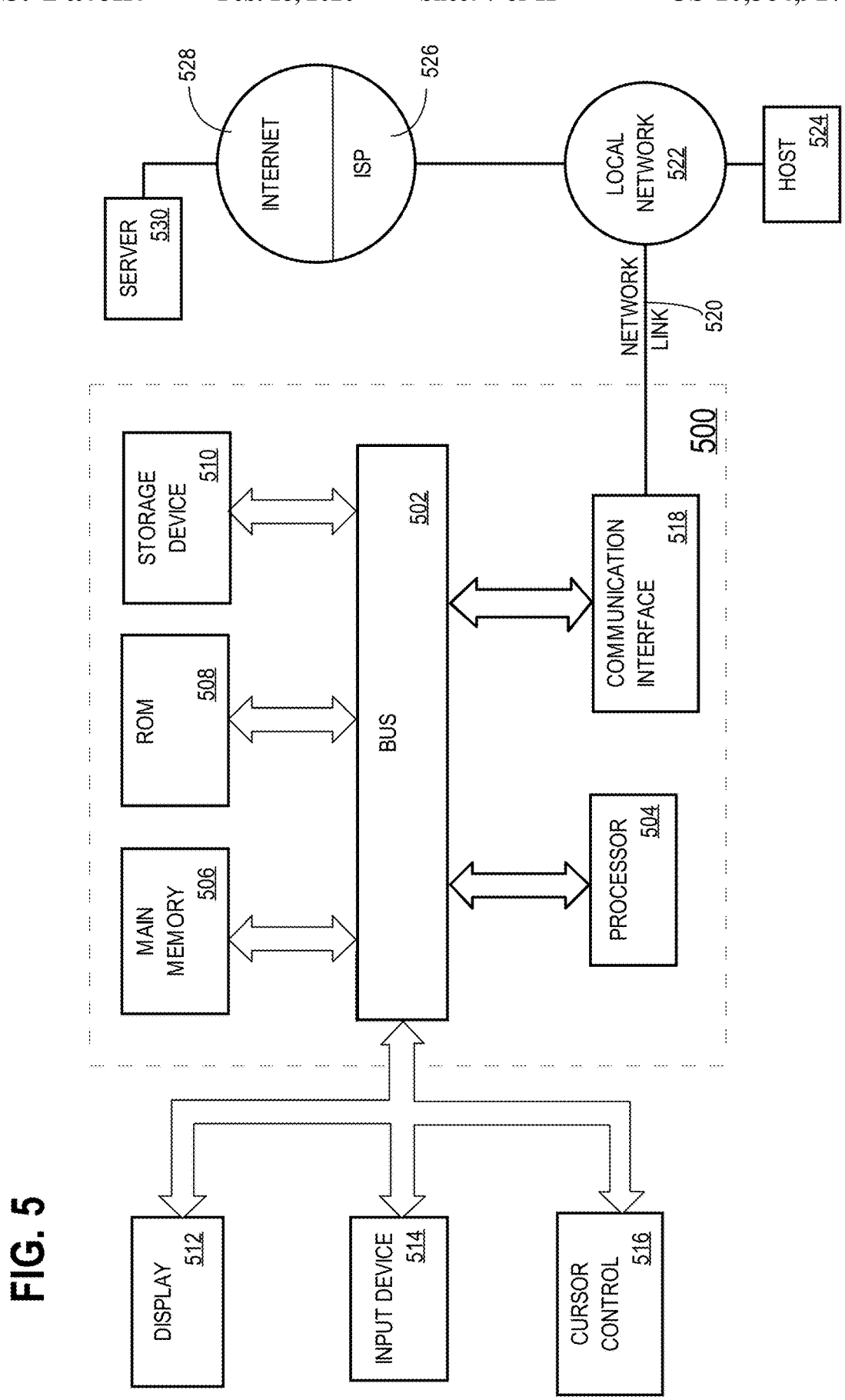
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus, comprising:
a plurality of display modules interconnected to form a tubular simulation display, each display module of the plurality of display modules including a plurality of interconnected display panels arranged to form a concave barrel segment in a coil shape with the plurality of interconnected display panels facing inward of the concave barrel segment and forming the interior of the concave barrel segment, the concave barrel segment having a first coil end, a second coil end, a first edge, and a second edge, each display module interconnected to a next display module via a coil end and an edge, the plurality of display modules arranged in parallel and supported in a uniform superstructure,
wherein the tubular simulation display is configured to allow users to traverse over portions of the plurality of display modules,
at least one non-coiled display positioned in a proximity of a first end of the tubular simulation display, wherein the at least one non-coiled display displays scenery in a forward facing orientation.

2. The apparatus of claim 1, wherein the tubular simulation display displays a visual simulation.

3. The apparatus of claim 1, wherein the tubular simulation display displays a visual advertisement.

4. The apparatus of claim 1, wherein the tubular simulation display displays a video.

5. The apparatus of claim 1, further comprising:
at least one display signal generator that is communicatively connected to the plurality of display panels included in a display module of the plurality of display modules,
wherein the at least one display signal generator generates video signals to be displayed on the plurality of display panels in the display module.

6. The apparatus of claim 1, wherein the tubular simulation display is a skate ramp.

7. An apparatus, comprising:
a plurality of display modules interconnected to form a curved skate ramp, each display module of the plurality of display modules including a plurality of interconnected display panels arranged to form a curve with the plurality of interconnected display panels facing inward of the curve, the plurality of display modules arranged in parallel and supported in a uniform superstructure;
wherein the curved skate ramp is configured to allow skaters to traverse over portions of the plurality of display modules,
at least one non-coiled display positioned in a proximity of a first end of the curved skate ramp,
wherein the at least one non-coiled display displays scenery in a forward facing orientation.

8. The apparatus of claim 7, wherein the curved skate ramp displays a visual simulation.

9. The apparatus of claim 7, wherein the curved skate ramp displays a visual advertisement.

10. The apparatus of claim 7, wherein the curved skate ramp displays a video.

11. The apparatus of claim 7, further comprising:
at least one display signal generator that is communicatively connected to the plurality of display panels included in a display module of the plurality of display modules,
wherein the at least one display signal generator generates video signals to be displayed on the plurality of display panels in the display module.

12. A method, comprising:
interconnecting a plurality of display modules to form a tubular simulation display, each display module of the plurality of display modules including a plurality of interconnected display panels arranged to form a concave barrel segment in a coil shape with the plurality of interconnected display panels facing inward of the concave barrel segment and forming the interior of the concave barrel segment, the concave barrel segment having a first coil end, a second coil end, a first edge, and a second edge, each display module interconnected to a next display module via a coil end and an edge, the plurality of display modules arranged in parallel and supported in a uniform superstructure,
wherein the tubular simulation display is configured to allow users to traverse over portions of the plurality of display modules,
displaying scenery in a forward facing orientation on at least one non-coiled display positioned in a proximity of a first end of the tubular simulation display.

13. The method of claim 12, further comprising:
displaying a visual simulation on the tubular simulation display.

14. The method of claim 12, further comprising:
displaying a visual advertisement on the tubular simulation display.

15. The method of claim 12, further comprising:
displaying a video on the tubular simulation display.

16. The method of claim 12, further comprising:
generating video signals to be displayed on the plurality of display panels.

17. The method of claim 12, wherein the tubular simulation display is a skate ramp.

* * * * *